US006968164B2

(12) United States Patent
Toporski

(10) Patent No.: US 6,968,164 B2
(45) Date of Patent: Nov. 22, 2005

(54) METHOD OF CONTROLLING FILTER BANDWIDTH IN A RADIO RECEIVER FOR A DUPLICATIVE BROADCAST SIGNAL

(75) Inventor: Todd A. Toporski, Northville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 403 days.

(21) Appl. No.: 10/441,138

(22) Filed: May 19, 2003

(65) Prior Publication Data

US 2004/0235441 A1 Nov. 25, 2004

(51) Int. Cl.[7] ............................ H04B 1/18; H04H 1/00
(52) U.S. Cl. ................... 455/150.1; 455/3.01; 455/266
(58) Field of Search .............................. 455/3.01, 3.02, 455/68, 70, 71, 45, 150.1, 179.1, 180.1, 185.1, 455/186.1, 188.1, 200.1, 552.1, 553.1, 230, 455/266

(56) References Cited

U.S. PATENT DOCUMENTS 5,155,862 A * 10/1992 Hansen ....................... 455/266
5,584,051 A 12/1996 Göken
6,246,672 B1 6/2001 Lumelsky
6,378,101 B1 * 4/2002 Sinha et al. ................ 714/755
6,445,750 B1 * 9/2002 Chen et al. ................. 455/108
6,622,007 B2 * 9/2003 Linden ....................... 455/3.01

FOREIGN PATENT DOCUMENTS

| | | |
|---|---|---|
| EP | 0946011 | 9/1999 |
| EP | 0961461 | 12/1999 |
| EP | 1022873 | 7/2000 |

* cited by examiner

*Primary Examiner*—Quochien B. Vuong
(74) *Attorney, Agent, or Firm*—MacMillan, Sobanski & Todd LLC

(57) ABSTRACT

A radio receiver performs a tune to a target frequency channel to recover a main audio program signal from a duplicative signal wherein the duplicative signal includes a primary signal and a backup signal both containing the main program audio signal. The backup signal is provided in a center portion of the target frequency channel and the primary signal is provided in an upper and lower sideband portion of the target frequency channel. The backup signal contains an identifying data which relates to the presence of the primary signal. The method includes tuning to the target frequency channel. The receiver filters the target frequency channel using a narrow bandwidth. A determination is made whether the identifying data is present. If the identifying data is present, then the main audio program is retrieved from the primary signal using a wide bandwidth, otherwise the narrow bandwidth is used to retrieve the main audio program from the backup signal.

9 Claims, 3 Drawing Sheets

METHOD OF CONTROLLING FILTER BANDWIDTH IN A RADIO RECEIVER FOR A DUPLICATIVE BROADCAST SIGNAL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to filtering an audio broadcast signal, and more specifically, to a method for switching bandwidths in the presence of a duplicative signal.

2. Description of the Related Art

With the introduction of terrestrial digital audio broadcasting, a radio listener has the opportunity to experience a higher quality of broadcast reception utilizing digital broadcast as opposed to the traditional analog broadcast. Digital audio broadcasting offers improved reception, better audio quality, and enhanced data services.

A duplicative audio broadcast system simultaneously transmits 1) a primary channel having at least a main program content and preferably including a supplemental data stream, and 2) a backup channel with main program content that is at least a partial duplicate of the main program content in the primary channel but usually without the supplemental data stream. Certain differences in the backup channel transmission allow it to be received by a receiver under conditions in which the primary channel is unreceivable.

To receive the full benefits of digital audio broadcasting, listeners must have a digital audio receiver to receive the digital audio broadcast. Therefore there will be a transition period as listeners migrate from analog audio receivers to digital audio receivers. During the transition period, if a broadcast station wants to maintain their listening audience, it must transmit both a digital broadcast for those listeners who are capable of receiving the digital broadcast and an analog broadcast for those listeners who are still utilizing the analog audio receiver.

A method of simulcasting both the digital signal and the analog signal over a frequency range for a particular audio broadcast station has recently become available. In-Band On Channel (IBOC) is a system that has been adapted to transmit a hybrid signal comprising an analog signal on a center portion of the frequency range and a digital signal occupying an upper and lower side portion of the frequency range. Digital radio receivers that have been adapted to receive both the digital signal and the analog signal uses the digital signal as its primary channel and the analog signal as a backup channel.

A preferred mode of reception is to receive and reproduce the digital signal as opposed to the analog signal due to the enhanced sound quality and the supplemental data stream provided by the digital signal. However, due to the differences in the transmission power levels, propagation, and performance in fringe areas, the coverage area of the analog signal in which a useful signal can be received is typically larger than the coverage area for the digital signal. A hybrid receiver needs to know if a digital signal is present, and if so, whether the signal quality is strong enough to receive the digital signal. If the digital signal is not present or the signal quality is below a certain threshold, then the backup channel must be processed to receive the audio broadcast.

Eventually, hybrid stations may switchover to an all digital audio broadcast station while retaining the duplicative nature of the broadcast signal (i.e., both the primary and backup channels are digital). In the all digital duplicative system, the backup channel transmits at a lower effective data rate in order to provide a more robust signal that can be received during times that (or at a place where) the primary channel is impaired. In order to achieve a lower data rate, the supplemental data and possibly some portion of the main program content are omitted from the backup channel (e.g. by encoding the main audio program at a lower bit rate).

Each broadcast signal is adapted to occupy its assigned frequency channel wherein the broadcast signal contains a transmitted energy used to carry information such as a main audio program or other related broadcast data. Energy from interfering channels (e.g., adjacent channels) may still be present in the channel of interest and may impede the reception of the desired broadcast signal. It is known to adapt the receiver bandwidth to the signal conditions in order to improve signal-to-noise ratio (SNR) of a reproduced audio signal and eliminate unwanted energy transmitted from the adjacent channels.

Since the IBOC system transmits the primary signal in the upper and lower sideband portions the frequency channel, a wide bandwidth as opposed to a narrow bandwidth must be used to pass the primary signal. However, since it is undetermined whether a primary signal is present when initially tuning to the target frequency channel, the audio output may include adjacent channel interference or other noise or distortion if the passband is set to the wide bandwidth and the primary signal is not present.

Under weak signal conditions (e.g., fringe areas), the receiver may conclude that a station is analog (backup) only and therefore adopt a narrow bandwidth even though the station is a hybrid station. When the digital (primary) signal gets stronger (e.g., vehicle closer to the transmitter), the receiver may not detect the primary signal because the receiver is in narrow bandwidth. Therefore, a lower quality backup signal may continue to be used even after a usable primary signal is present.

SUMMARY OF THE INVENTION

The present invention has the advantage of determining whether a digital signal is present on a primary channel of a duplicative broadcast signal without the time delay of adopting a wide bandwidth and then attempting to detect a digital signal. This is achieved by retrieving identifying data from a backup channel of the duplicative broadcast and setting the bandwidth.

In one aspect of the invention, a method is provided for tuning to a target frequency channel to recover a main audio program signal from a duplicative signal wherein the duplicative signal includes a primary signal and a backup signal both containing the main program audio signal. The backup signal is provided in a center portion of the target frequency channel and the primary signal is provided in an upper and lower sideband portion of the target frequency channel. The backup signal contains an identifying data which relates to the presence of the primary signal. The method includes tuning to the target frequency channel. The receiver filters the target frequency channel using a narrow bandwidth. A determination is made whether the identifying data is present. If the identifying data is present, then the main audio program is retrieved from the primary signal using a wide bandwidth, otherwise the narrow bandwidth is used to retrieve the main audio program from the backup signal.

DETAILED DESCRIPTION OF PREFERRED EMBODIMENTS

Figure 1:
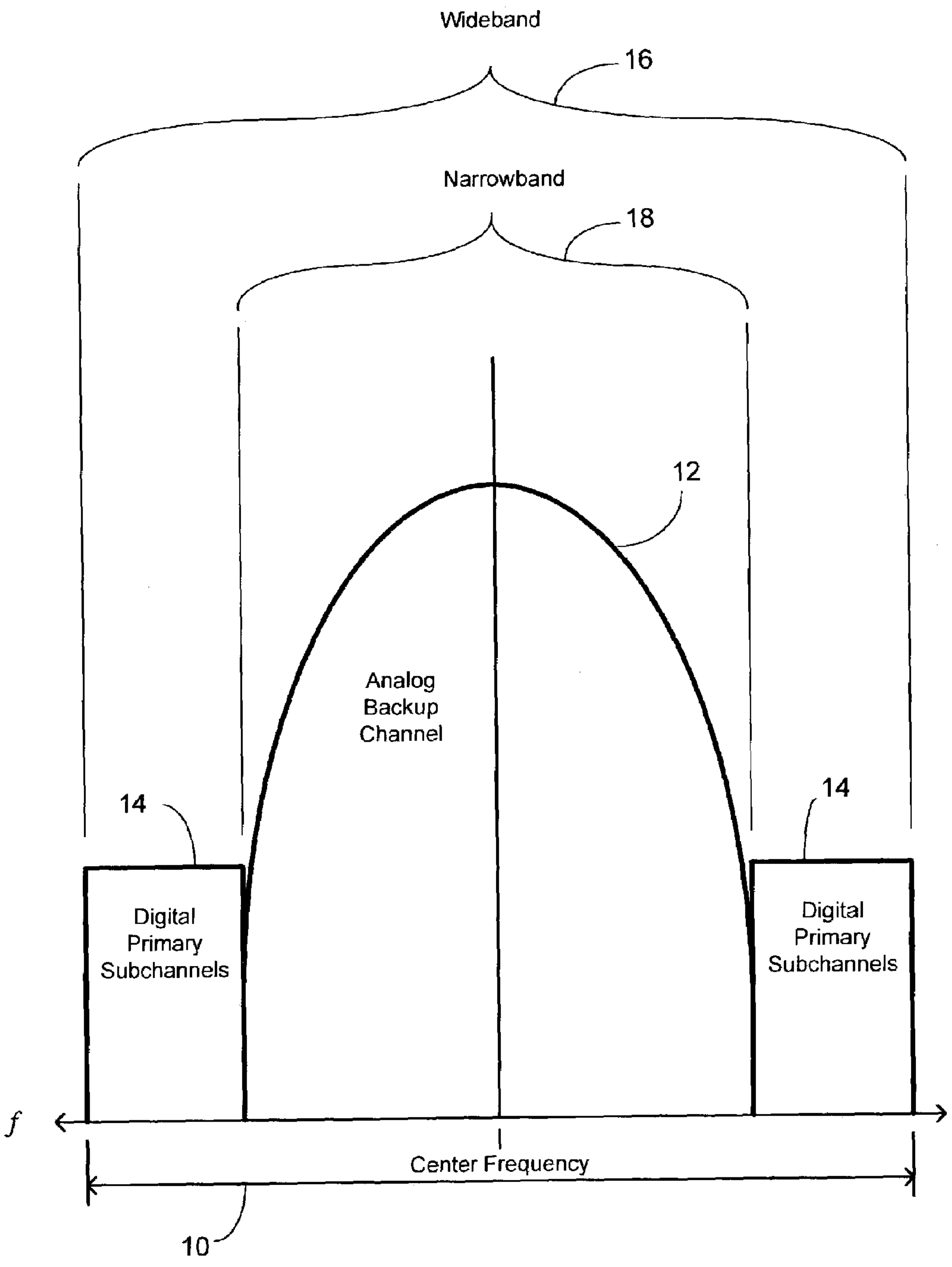
FIG. 1 is a frequency spectrum showing a duplicative signal.

Referring now to Drawings and particularly to FIG. 1, there is shown a broadcast arrangement for a duplicative broadcast system including primary/backup audio broadcast signals. The primary/backup audio broadcast signals in the preferred embodiment comprise a hybrid digital/analog IBOC signal. A frequency range or channel 10 for an IBOC signal includes an analog backup signal 12 which occupies a center portion of the frequency range, while a digital primary signal 14 occupies an upper sideband portion and a lower sideband portion of the frequency range. A wide bandwidth 16 is used within a receiver to acquire the upper and lower sideband portion containing the digital primary signal 14 while a narrow bandwidth 18 is used within a receiver to acquire the center portion containing the analog backup signal 12. Alternatively, the duplicative broadcast system can comprise a digital primary signal and a digital backup signal.

Figure 2:
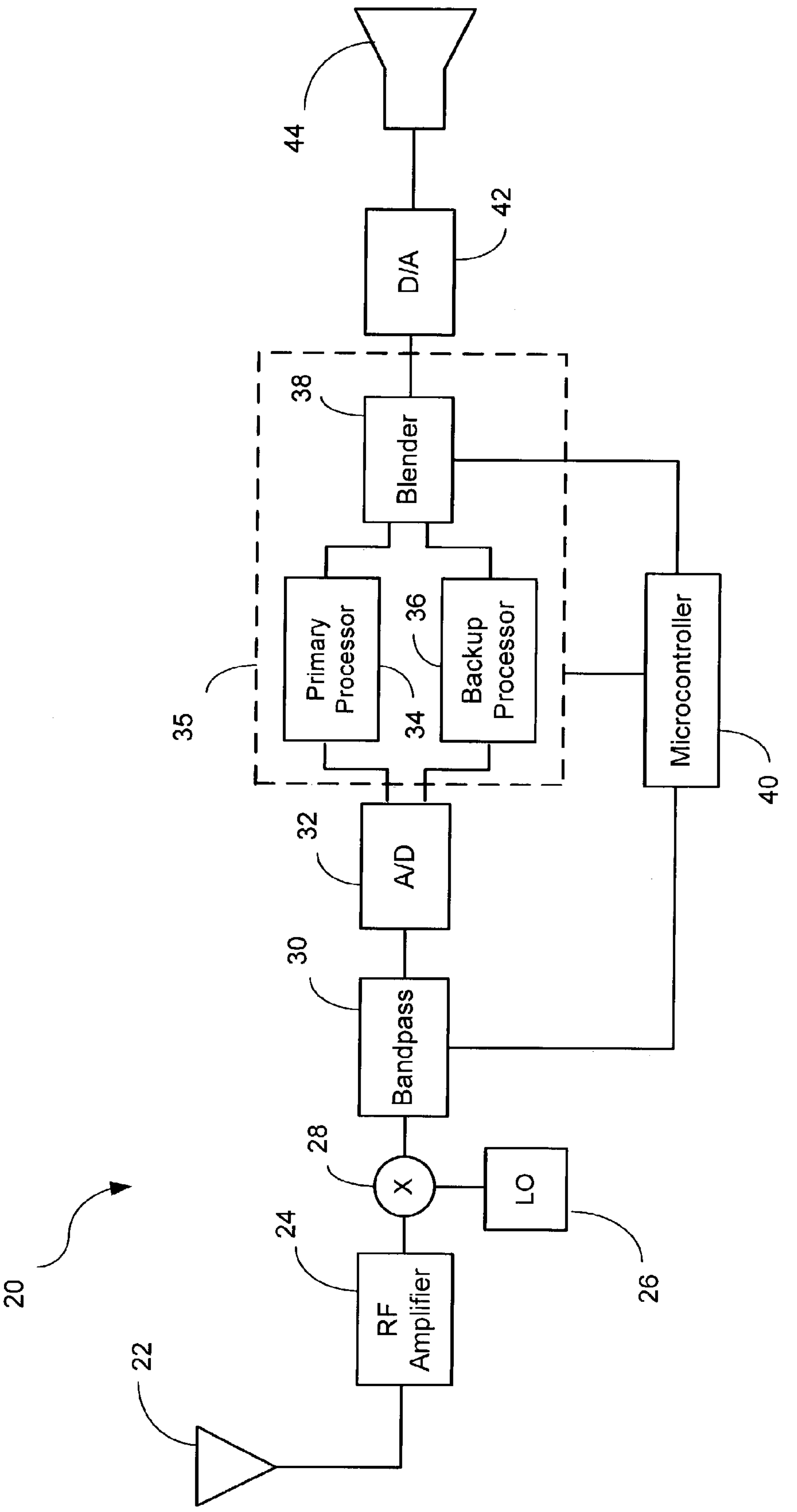
FIG. 2 is a block diagram showing a radio receiver for receiving a duplicative audio broadcast signal.

Referring to FIG. 2, there is shown a block diagram of a receiver used to filter the audio broadcast signal in the presence of a duplicative broadcast system. A receiver 20 comprises an antenna 22 for receiving the audio broadcast signal, such as a duplicative signal, from the duplicative broadcast station. The antenna 22 is connected to an RF amplifier 24 which provides a target signal to an input of a mixer 28. A local oscillator signal 26 is also connected to the input of the mixer 28 for converting the RF signal to an intermediate frequency (IF) signal. The IF signal is then passed through a bandpass 30 to pass the analog backup signal 12 or both the digital primary signal 14 and the analog backup signal 12. The output is then passed to an analog-to-digital converter 32 and processed in one or more digital signal processor (DSP) modules 35 for decoding (hereinafter decoding also includes demodulation) and processing the duplicative signal. In the preferred embodiment, the DSP module 35 contains a primary processor 34 for processing the digital primary signal 14 and a backup processor 36 for processing the analog backup signal 12. Following decoding and processing of the duplicative signal, a main audio program signal recovered from both the digital and analog transmission portions will be provided to a blender 38. Depending upon the presence of the digital transmission portion and a signal quality of the digital transmission portion of the IF signal, the digital primary signal may be blended with the analog backup signal 12 resulting in the main audio program signal which is then converted to analog in a digital-to-analog converter 42 and reproduced by a speaker 44.

In the preferred embodiment, the narrow bandwidth 18 is active in the bandpass 30 to limit noise and adjacent channel interference when tuning to the frequency range since it is undetermined if a duplicative signal is present at the frequency range when initiating a tune function to a target frequency channel. When the analog transmission portion of the IF signal is received and decoded, a microcontroller 40 will monitor the decoded analog backup signal to determine the presence of an identifying data relating to the station and programming content of the audio broadcast station providing the audio broadcast signal. The identifying data may contain an identification code indicating that the digital primary signal is present within the audio broadcast signal. Identification codes relating to the station and programming content of the digital broadcast station may be included in the analog signal by using Radio Broadcast Data System (RBDS) technology. RBDS uses various codes and features such as PTY (Program Type), PTYN (Program Type Name), PI (Program Identification), PS (Program Service) or ODA (Open Data Application) to provide information concerning station and programming content of the analog backup signal 12. An RBDS data in the form of the PTY, PTYN, or other codes is preferably transmitted in the analog backup signal 12 to indicate that the digital broadcast station provides the IBOC signal or other types of duplicative signals. An example of an identification code may include a broadcast type code which identifies the presence of the digital broadcast station indicating that the digital primary signal 14 is provided on the frequency range.

If the presence of the primary digital signal 14 is detected by the identifying data in the analog backup signal 12, then the microcontroller 40 will then set the bandpass 30 to the wide bandwidth 16 to pass both the digital primary signal 14 and the analog backup signal 12.

However, if a signal quality of the digital primary signal 14 remains below a predetermined threshold, blending of the digital primary signal 14 and analog backup signal 12 will not occur. Since the SNR of the analog backup signal 12 could be lower when using the wide bandwidth (since the analog backup signal occupies the center portion of the frequency range), the microcontroller 40 will set the bandpass 30 to the narrow bandwidth 18 to acquire only the analog backup signal 12. Calculations are performed in a decoder on the digital primary signal 14 for obtaining parameters such as bit error rate, the SNR, or a signal quality indicator for determining the quality of the digital primary signal 14. After decoding, data processors monitor the parameters and compare the parameters (either individually or in combination) with the predetermined threshold (e.g. 10% bit error rate) to detect an impaired digital primary signal 14. If the digital primary signal 14 is impaired, then the microprocessor 40 will switch back to the narrow bandwidth 18 to receive only the analog backup signal 12 (assuming that the wide bandwidth must have been implemented in order to receive and decode the digital data when monitoring the parameters).

Figure 3:
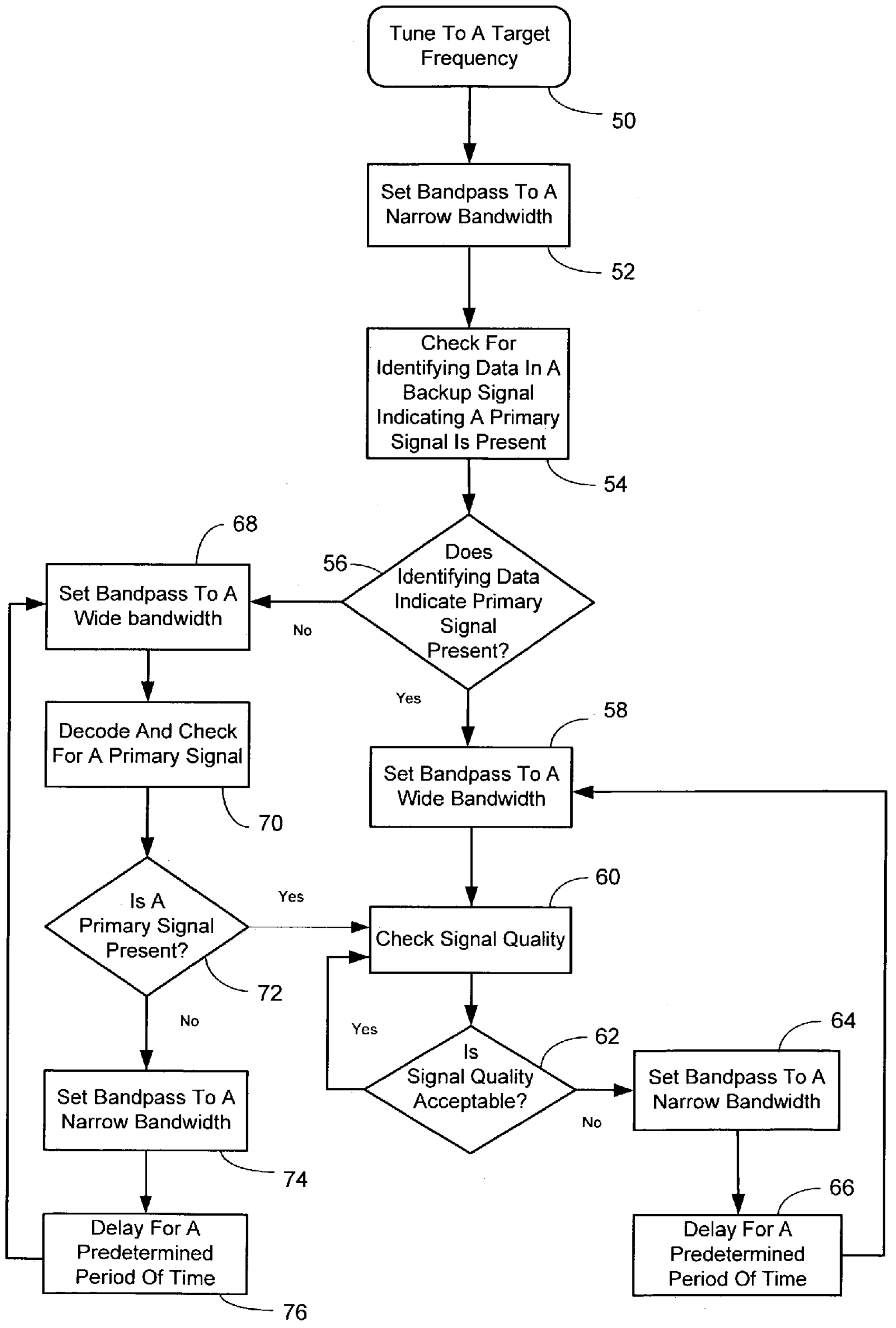
FIG. 3 is a flowchart showing a preferred method of the present invention.

FIG. 3 illustrates a flowchart of a method to acquire a digital signal from the duplicative signal. In step 50, a tune command is initiated to acquire the target frequency channel. A tune operation includes any type of method used to select the frequency of the digital broadcast station. This includes a tune function, a scan function, a memory preset, or a seek function. In step 52, the bandpass is set to the narrow bandwidth. Defaulting to the narrow bandwidth when tuning to a new target frequency channel limits noise and adjacent channel interference from adjacent stations in the event that the duplicative signal is not present. In step 54, the microcontroller attempts to retrieve an identifying data from the backup signal indicating the presence of a duplicative signal. In step 56, a determination is made whether the identifying data indicates that a primary signal is present. If a determination is made in step 56 that the identifying data does indicate that the primary signal is present, then the bandpass is set to the wide bandwidth in step 58 and the primary signal is received and decoded. In step 60, the signal quality of the primary signal is checked. A determination is made whether the signal quality of the primary signal remains below the predetermined threshold in step 62. The signal quality below the predetermined threshold may indicate that the receiver is in a fringe area (e.g., distant location from the broadcast station where the broadcast signal is deteriorated) or a poor reception area. If the signal quality of the primary signal is determined to be below the predetermined threshold in step 62, then the bandpass is set to a narrow bandwidth to acquire and output the backup signal in step 64. The receiver waits a predetermined period of time in step 66 and then a return is made to step 58 to set the bandpass to the wide bandwidth and recheck the signal quality of the primary signal. If the signal quality is determined to be above the predetermined threshold in step 62, then a return is made to step 60 for continually checking the primary signal for signal quality.

If the primary signal is determined not to be present in step 56, then the bandpass maintains the narrow bandwidth for receiving the backup signal. However, due to broadcast issues where the identifying data in the backup signal is corrupt or if the backup signal omits the identifying data indicating the presence of the primary signal, an attempt is made to determine if the primary signal is present despite the omission or inaccuracy of the identifying data. In step 68, the bandpass is set to the wide bandwidth. In step 70, an attempt is made to decode and check for the primary signal. In step 72, a determination is made whether the primary signal is present. If the primary signal is present, then the bandpass maintains the wide bandwidth and the signal quality is continually checked in step 60 and 62 until the signal quality is determined to be below the predetermined threshold or a new target frequency is tuned to.

If the primary signal is not determined to be present in step 72, then the bandpass is reset to the narrow bandwidth in step 74 for receiving the backup signal. In step 76, the receiver delays for the predetermined period of time before returning to step 68 to recheck for the presence of the primary signal. An attempt to recheck for the primary signal is made in the event the receiver was outside of the broadcast range of the primary signal during the previous attempt to check for the primary signal.

What is claimed is:

1. A method of tuning to a target frequency channel, wherein said target frequency channel potentially includes a duplicative signal, wherein said duplicative signal includes a primary signal and an backup signal both containing an audio signal, wherein said backup signal is provided in a center portion of said target frequency channel and said primary signal is provided in an upper and lower sideband portion of said target frequency channel, wherein said backup signal contains an identifying data for indicating the presence of said primary signal, said method comprising the steps of:

tuning to said target frequency channel;

filtering said target frequency channel using a narrow bandwidth;

determining whether said identifying data is present; and if said identifying data is present, then filtering said target frequency channel using wide bandwidth, otherwise continuing to use said narrow bandwidth.

2. The method of claim 1 further comprising the step of determining a signal quality of said primary signal using said wide bandwidth and if said signal quality is below a threshold, then using said narrow bandwidth to filter said target frequency.

3. The method of claim 2 further comprising the step of using said wide bandwidth to determine said signal quality of said primary signal after a predetermined period of time, and if signal quality is below said threshold, then using said narrow bandwidth to filter said target frequency.

4. The method of claim 1 wherein said primary signal includes a digital signal.

5. The method of claim 1 wherein said backup signal includes an analog signal.

6. The method of claim 5 wherein said analog signal includes a RBDS data containing said identifying data.

7. The method of claim 1 wherein said backup signal includes a digital signal.

8. The method of claim 7 wherein said backup signal transmits at a lower effective data rate than said primary channel.

9. The method of claim 8 wherein said backup signal is transmitted without a supplemental data stream.

* * * * *